Patented July 9, 1929.

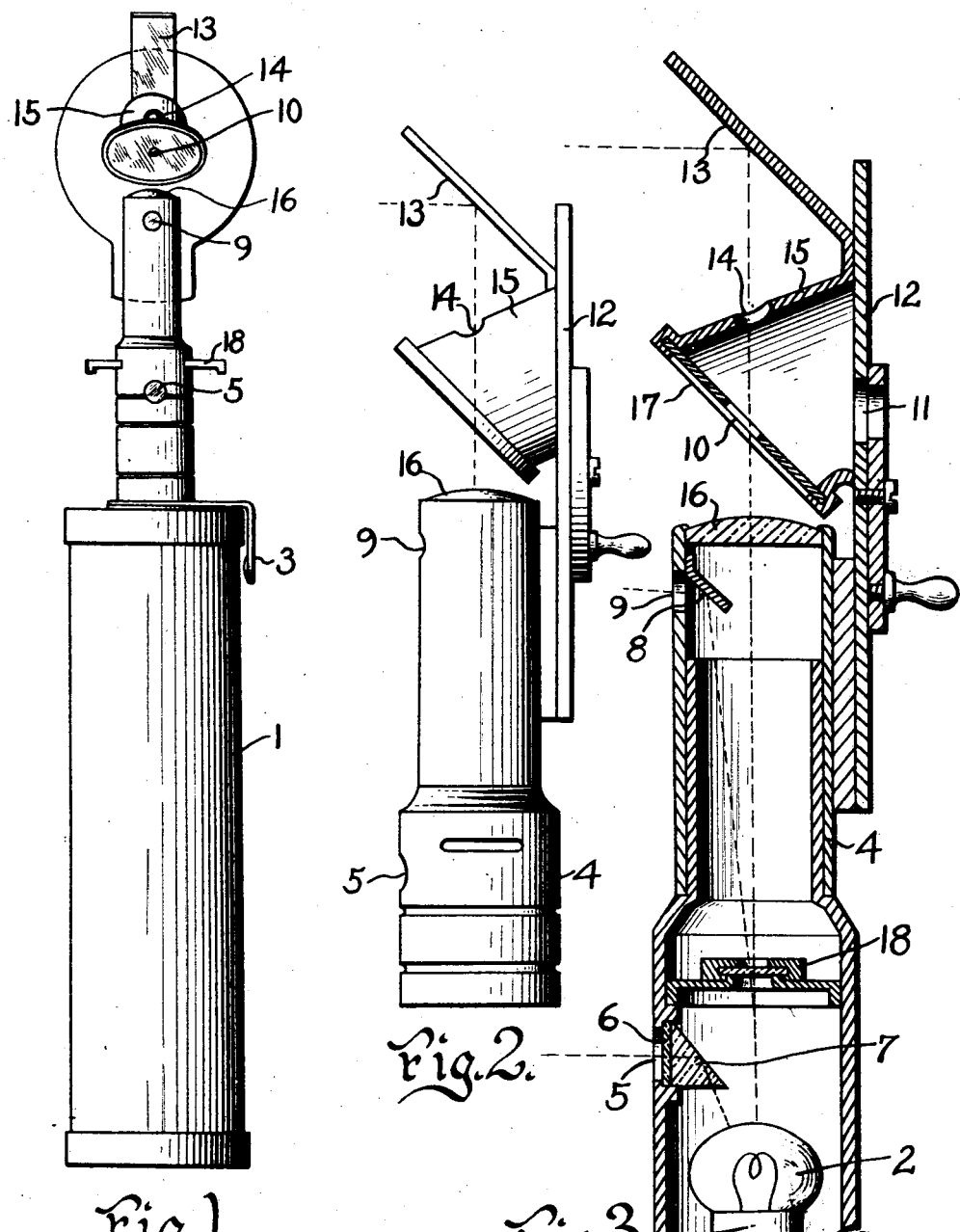

1,720,035

UNITED STATES PATENT OFFICE.

HENRY L. DE ZENG, OF GENEVA, NEW YORK, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMOLOGIC INSTRUMENT.

Application filed February 12, 1927. Serial No. 167,694.

This invention relates to ophthalmological instruments and has particular reference to such instruments used in retinoscopy wherein illuminated fixation objects have been provided for the patient.

This application is a continuation in part of my co-pending application Serial Number 587,871, filed September 13, 1922.

The principal object of this invention is to provide an illuminated fixation object to fix the eye of the patient during the examination.

Another object of the invention is to provide a colored illuminated fixation object.

Another object of the invention is to provide a plurality of aligned fixation objects to hold the eye of the patient during examination.

Another object of the invention is to provide a fixation object which may be illuminated by the main source of illumination of the instrument itself.

Another object of the invention is to provide reflecting means to reflect the illumination from the main source of illumination of the instrument to illuminate the fixation object.

Other objects and advantages of the invention will become apparent from the following description taken in connection with the accompanying drawings, and it will be understood that many changes in the arrangement of details of construction may be made without departing from the spirit of the invention as set forth in the accompanying claims. I, therefore, do not wish to be limited to the exact details and arrangements shown and described, the preferred forms only having been shown by way of illustration.

Referring to the accompanying drawings:

Figure 1 is a front elevation of a retinoscope embodying the invention;

Figure 2 is a partial side elevation of Figure 1;

Figure 3 is a partial longitudinal cross section of Figure 1.

One of the most important objects of the invention is to provide a fixation object or objects approximately in vertical alignment with the sight opening of the instrument rather than one considerably disposed to the right or left thereof. Theoretically the fixation object should be located at the eye of the operator and not be disposed either vertically or horizontally therefrom, but as it is not advisable for the patient to look at the mirror, and as the disposing of the fixation object either up or down is better than when disposed to the right or left of the mirror, the location of the fixation object in my invention constitutes an improvement, as the eye of the patient is held in longitudinal alignment with the sight opening of the instrument. To facilitate the holding of the patient's eye in longitudinal alignment with the sight opening I have found it desirable to use a plurality of illuminated fixation objects, all of them arranged in longitudinal alignment with the sight opening so that if the patient's eye is moved upward or downward it will travel in a line longitudinally aligned with the sight opening of the instrument.

Referring to the drawings, wherein similar reference characters are used to denote corresponding parts throughout, 1 designates the casing or body portion which forms the grasping handle and receives in the usual manner the battery (not shown) which actuates the lamp 2 which is controlled by means of the switch 3. A tubular neck piece 4 surrounds the lamp 2 and is connected with the body portion 1 in the usual manner. The neck piece 4 is provided in its side walls with a light opening 5 which as illustrated is provided with a lens 6, although if desired the latter may be dispensed with. This forms a fixation point and in its preferred form the lens 6 is red. Behind the lens 6 is a reflector 7 which may be a prism reflector as shown behind the opening 5 in Fig. 3, or it may be a plain reflector 8 as shown behind the opening 9 in the upper portion of the tube 4, Fig. 3. To provide means of holding the eye of the patient in longitudinal alignment with the sight opening 10 in the mirror reflector and the opening 11 in the supporting plate 12, I provide a second opening 9 in the walls of the tube 4 and place behind it the reflector 8 so that the light from the bulb 2 may be deflected through the opening 9. This opening 9 may be left free or it may be fitted with a lens 6, either colored or clear, and a plain reflector 8 or a prism reflector 7 may be used.

In addition to the openings 5 and 9 I provide a reflector 13 vertically aligned with a sight opening 10 and placed at an angle to the supporting plate 12. In order that the light from the bulb 2 may be conducted through the tube 4 through the light opening 10, I provide an additional opening 14 in the mirror support 15. This opening 14 is in vertical alignment with the opening 10 in the mirror. The reflector 13 provides a third fixation object in longitudinal alignment with the sight opening 10. This mirror may be plain or colored so that either colored light or white light may be reflected therefrom.

The construction of the retinoscope is the usual prior art construction comprising a chamber for the lamp 2, the tube 4, a condensing lens 16, the reflector 17, the sight opening 10 therein and the sight opening 11 in the supporting plate 12. In the light chamber leading to the tube 4 may be placed, if desired, a movable screen 18 having plain or colored lenses or lenses adapted to transmit transfused light. The screen 18 may be removed to bring any one of the desired lenses in alignment with the light.

In operation the bulb 2 is lighted by means of the switch 3. Light from this bulb is deflected through the opening 5 and the lens 6 by means of the prism reflector 7. Light is also reflected through the opening 9 from the bulb 2 by means of the reflector 8, which reflector may be a prism or a plain reflector, and the opening 9 may be fitted with a lens either colored or plain, as desired. The light from the lamp passing through the tube 4 and through the sight opening 10 and the opening 14 in alignment therewith strikes the reflector 13 and is illuminated thereby, this reflector being in longitudinal alignment with the sight opening 10. If desired any one of the fixation objects at 5, 9 and 13 may be used, any two may be used, or all three may be used together and these fixation objects may be provided either for plain white illumination or for colored illumination, as has been described.

During the examination of the patient's eye by the operator through the openings 11 and 10 the patient is directed to fix his eye on one of the fixation objects, such as 5, or he may be instructed to cast his eye along the line of the fixation objects 5, 9 and 13, as preferred by the operator. It will be understood, of course, that the light from the bulb 2 is thrown into the patient's eye after passing through the tube 4 and onto the reflector 17, as is usual with instruments of this kind.

It will be apparent also that the various fixation objects may be shown in different colors simultaneously; for instance, one color at 9, another at 5, and another at 13.

From the foregoing description it will be apparent that I have provided simple and efficient means for providing illuminatable fixation objects for the patient's eye.

Having described my invention, what I claim is:

1. In an ophthalmologic instrument of the character described, a handle, a lamp supported thereby, a member having a light passage way extending from the lamp, a lens in the passage way a reflector in line with the lens and having a sight opening, and a second reflector beyond the first in line with the sight opening adapted to receive light from the sight opening and to reflect it to the patient's eye.

2. In an ophthalmologic instrument of the character described, a lamp, a reflector above the lamp, and having a sight opening, a second reflector above the first reflector, adapted to receive light from the lamp through the sight opening and to reflect it to the patient's eye.

3. In an ophthalmologic instrument, a source of light, a light passage-way leading from the source of light and having an opening intermediate its ends, a reflector within the passageway and inclined to said aperture and adapted to reflect light from the light source therethrough, a reflector beyond the end of the light passage-way and having an opening therein and adapted to reflect light from the light source in the same direction as the first reflector reflects, and a third reflector beyond the second reflector adapted to reflect light coming through the opening in the second reflector in the same direction as the other two reflectors.

4. In an instrument for reflecting light into an eye, a light source, a member having a light passage way from the light source and having an aperture intermediate its ends through which the light may shine, a reflector beyond the light passage way adapted to reflect the light into an eye, means aligned with the aperture to shine the light therethrough and a colored member in the aperture which will glow under the action of the light, said aperture being on the side of the instrument viewable by the eye receiving light from the reflector.

5. In an instrument for reflecting light into an eye, a light source, a member having a light passage way from the light source and having an aperture intermediate its ends through which the light may shine, a reflector beyond the light passage way adapted to reflect the light into an eye, means aligned with the aperture to shine the light therethrough, said aperture being located on the side of the instrument on which the eye receiving the light from the reflector is located and viewable by the eye receiving the said reflected light.

6. In an instrument for reflecting light into an eye, a lamp, a light passageway leading from the lamp having a recess therethrough, a reflector aligned with the light passageway and adapted to reflect the light into an eye, and a prism within the passageway aligned with the recess and adapted to reflect light therethrough from the lamp, said recess being upon the same side of the instrument as the eye is located that receives the light from the reflector and viewable from said eye.

7. In an instrument for reflecting light into an eye, a lamp, a member having a light passageway leading from the lamp and having a recess therethrough, a lens aligned with the recess and a reflector in the passageway and angularly inclined to the lens and lamp and adapted to reflect the light through the lens and the recess into the patient's eye.

8. In an instrument for reflecting light into an eye, a lamp, a member having a light passageway leading therefrom and having a plurality of openings therein and reflectors in the passaegway with reflecting surfaces angularly inclined with the openings and the lamp and adapted to reflect light from the lamp into the patient's eye.

9. In an instrument for reflecting light into an eye, a lamp, a member having a light passageway leading therefrom and having a plurality of longitudinally aligned openings therein and reflecting means in the passageway angularly inclined with the openings and the lamp and adapted to reflect light from the lamp therethrough into the patient's eye.

10. In an instrument for reflecting light into an eye, a light source, a light passageway leading from the light source and having a plurality of openings longitudinally spaced intermediate its ends and means within the passageway related to each of said openings to shine the light from the light source through each of said openings.

11. In an ophthalmologic instrument for reflecting light into an eye, a light source, a member having a light passageway having an aperture through which the light may shine, a reflector aligned with the passageway and adapted to reflect light into an eye, a second reflector in the light passageway adapted to shine the light through the aperture, said aperture being on the same side of the instrument as the eye that receives the light from the reflector and viewable from said eye.

HENRY L. DE ZENG.